United States Patent
Hou

(10) Patent No.: US 9,870,076 B1
(45) Date of Patent: Jan. 16, 2018

(54) TRANSMITTER PEN POSITIONING SYSTEM

(71) Applicant: Nanjing Jiafan Electronic Technologies Co., Ltd., Nanjing (CN)

(72) Inventor: Alfred Samson Hou, Nanjing (CN)

(73) Assignee: Nanjing Jiafan Electronic Technologies Co., Ltd., Nanjing (CN)

( * ) Notice: Subject to any disclaimer, the term of this patent is extended or adjusted under 35 U.S.C. 154(b) by 0 days.

(21) Appl. No.: 15/256,510

(22) Filed: Sep. 3, 2016

(51) Int. Cl.
  *G06F 3/033* (2013.01)
  *G06F 3/038* (2013.01)
  *G06F 3/0354* (2013.01)

(52) U.S. Cl.
  CPC .......... *G06F 3/0386* (2013.01); *G06F 3/0383* (2013.01); *G06F 3/03545* (2013.01)

(58) Field of Classification Search
  CPC ... G06F 3/0386; G06F 3/0383; G06F 3/03545
  See application file for complete search history.

(56) References Cited

U.S. PATENT DOCUMENTS

| | | | | |
|---|---|---|---|---|
| 2004/0190085 A1* | 9/2004 | Silverbrook | ........ | G06F 3/03545 358/474 |
| 2004/0190092 A1* | 9/2004 | Silverbrook | ........ | G06F 3/03545 358/539 |
| 2004/0195310 A1* | 10/2004 | Silverbrook | ............ | G06F 3/014 235/375 |
| 2007/0140776 A1* | 6/2007 | Lapstun | ................ | B41J 2/17503 401/195 |
| 2009/0020345 A1* | 1/2009 | Lapstun | ................ | G06Q 20/10 178/19.05 |
| 2010/0014784 A1* | 1/2010 | Silverbrook | ........... | G06K 9/228 382/313 |
| 2014/0211103 A1* | 7/2014 | Baek | ................. | G02F 1/133753 349/12 |
| 2014/0362054 A1* | 12/2014 | Matsuki | ................ | G06F 3/0321 345/175 |
| 2016/0018910 A1* | 1/2016 | Walloth | ................. | G06K 9/222 345/179 |
| 2016/0196004 A1* | 7/2016 | Shimizu | ................ | G06F 3/0421 345/175 |

\* cited by examiner

*Primary Examiner* — Erin File
(74) *Attorney, Agent, or Firm* — Hershkovitz & Associates, PLLC; Abe Hershkovitz

(57) ABSTRACT

A transmitter pen positioning system includes a transmitter pen, at least two photo-receiving modules, and a signal processing unit. The transmitter pen generates a light beam signal. Each photo-receiving module has an optical lens and a photo-receiving sensor. The photo-receiving sensor receives the light beam signal passing through the optical lens via a first photo-receiving surface and a second photo-receiving surface and correspondingly converts the light beam signal into a first photocurrent signal and a second photocurrent signal. The signal processing unit receives the first and the second photocurrent signals, and correspondingly calculates an incident angle of the light beam signal according to a difference between the first and the second photocurrent signals and calculate position information of the transmitter pen according to the at least two incident angles. Accordingly, the complexity of the positioning system is simplified and a real-time position calculation is implemented.

15 Claims, 13 Drawing Sheets

TRANSMITTER PEN POSITIONING SYSTEM

BACKGROUND

1. Technical Field

The present disclosure relates generally to a positioning system, and more particularly to a transmitter pen positioning system.

2. Description of Related Art

Conventional positioning systems employing angle detection have relied on rotating transmitters or receivers, wherein the angle of a transmitter with respect to each receiver was based on the known rotation position of either the transmitters or the receivers. In these conventional schemes, the real-time update frequency of the transmitter's location is limited by the maximum rotation speed of the motors used. Due to the use of mechanical moving parts such as DC motors, product reliability and lifetimes may be more limited, these conventional systems also require more power, and can generate unwanted audible noise to the user. Highly accurate position detection depends on knowing the exact angle of the motor shaft, which can require complicated calibration and assembly or the use of expensive stepper motors.

Other conventional positioning systems measure distances directly by employing time-of-flight detection, rather than angle detection, and require the use of high-speed electronics to measure the time-of-flight precisely. For instance, to achieve millimeter positioning accuracy, time measurements with picosecond resolution are required. These systems require laser or RF pulses with ultrafast rise time as well as high-speed receivers, all of which add to the cost and complexity of the system.

To avoid the stringent requirement of measuring time-of-flight of fast light signals, alternative conventional systems have combined light output signals with ultrasound transmitters and receivers. Since sound travels at much slower speeds than light, there are fewer burdens on the system electronics to measure precise signal arrival times. However, ultrasound transmitters and receivers tend to be narrow-band devices and thus hard to pinpoint arrival times without sophisticated algorithms. Also, ultrasound transducers tend to be specialized components made of piezo-electric thin films and/or exotic materials, which are produced in limited quantities and thus can be costly.

SUMMARY

An objective of the present disclosure is to provide a transmitter pen positioning system to solve the above-mentioned problems.

In order to achieve the above-mentioned objective, the transmitter pen positioning system is applied to a writing surface and the transmitter pen positioning system includes a transmitter pen, at least two photo-receiving modules, and a signal processing unit. The transmitter pen has a light emitting element, which generates a light beam signal. At least two photo-receiving modules are installed at different positions on the writing surface. Each photo-receiving module has an optical lens and a photo-receiving sensor. The optical lens is mounted on an exterior surface of the photo-receiving module and receives the light beam signal to make the light beam signal pass through the optical lens. The photo-receiving sensor has a first photo-receiving surface and a second photo-receiving surface, and the photo-receiving sensor receives the light beam signal via the first photo-receiving surface and the second photo-receiving surface and correspondingly converts the light beam signal into a first photocurrent signal and a second photocurrent signal. The signal processing unit is electrically connected to at least two photo-receiving modules and receives the first photocurrent signal and the second photocurrent signal from each photo-receiving sensor, and the signal processing unit correspondingly calculates an incident angle of the light beam signal on the optical lens of each photo-receiving module according to a difference between the first photocurrent signal and the second photocurrent signal and calculates the position information of the transmitter pen according to at least two incident angles.

Accordingly, the transmitter pen positioning system is used to simplify system complexity, reduce costs, and lower consumption, implement the real-time position calculation, and further overcome the above-mentioned problems.

It is to be understood that both the foregoing general description and the following detailed description are exemplary, and are intended to provide further explanation of the present disclosure as claimed. Other advantages and features of the present disclosure will be apparent from the following description, drawings and claims.

DETAILED DESCRIPTION OF PREFERRED EMBODIMENT

Figure 1:
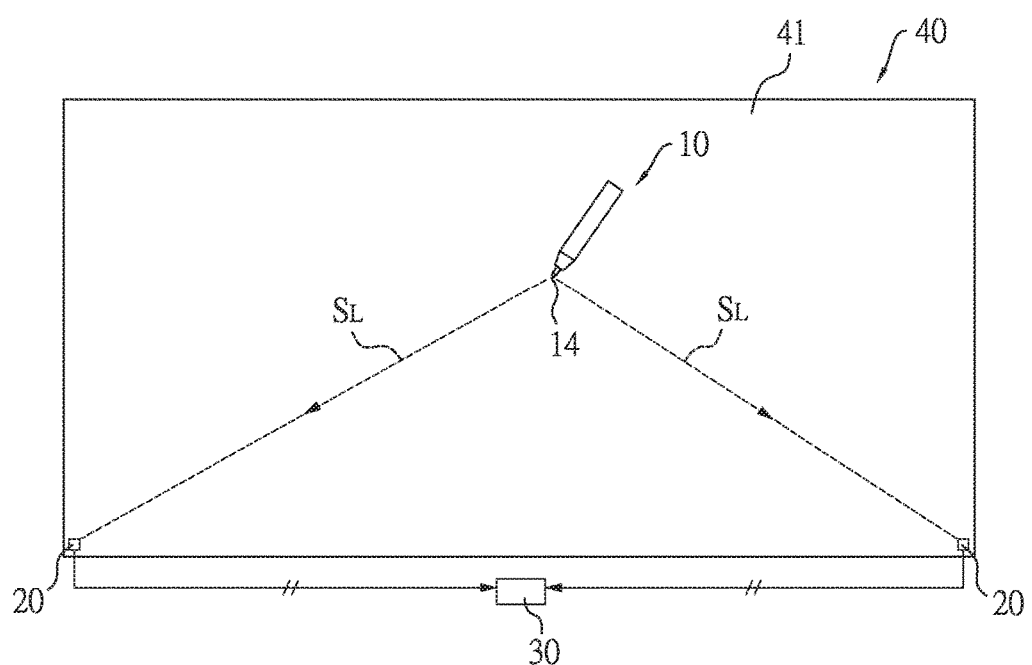
FIG. 1 is a schematic view of a transmitter pen positioning system according to the present disclosure.

Reference will now be made to the drawing figures to describe the present disclosure in detail.

As shown in FIG. 1, in this embodiment, the transmitter pen positioning system is, but not limited to, applied to a writing board 40 with a writing surface 41, such as a whiteboard. The transmitter pen positioning system includes a transmitter pen 10, at least two photo-receiving modules 20, and a signal processing unit 30.

Figure 2:
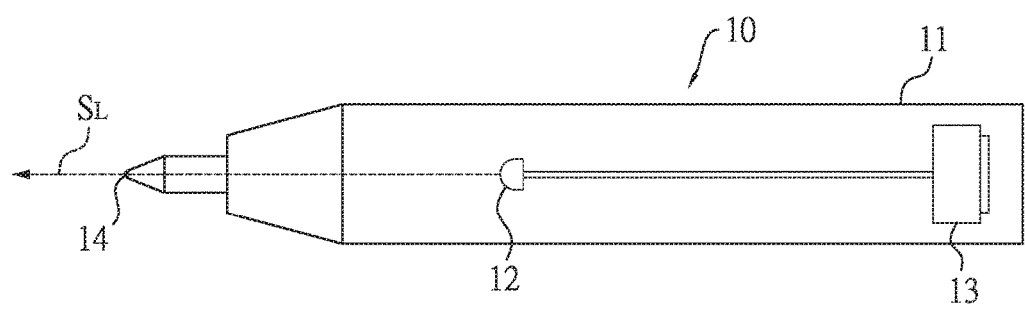
FIG. 2 is a schematic view of the transmitter pen according to the present disclosure.

As shown in FIG. 2, the transmitter pen 10 has a pen body 11, a light emitting element 12, a power supplying element 13, and a pointing tip 14. The light emitting element 12 and the power supplying element 13 are disposed in the pen body 11. Also, the light emitting element 12 can be, but not limited to, a light-emitting diode (LED) or a laser diode. The power supplying element 13 can be, but not limited to, a battery, such as a coin battery also called a button cell battery. Also, the power supplying element 13 is used to supply required power to the transmitter pen 10. The light emitting element 12 is electrically connected to the power supplying element 13. When the light emitting element 12 is turned on by pressing a power button (not shown) of the transmitter pen 10 or by contacting the pointing tip 14 to the writing surface 41, the light emitting element 12 of the transmitter pen 10 generates a light beam signal $S_L$ and the light beam signal $S_L$ is outwardly emitted. For example, when the pointing tip 14 is in contact with the writing surface 41, pressure on the pointing tip 14 activates an electrical switch (not shown) inside the transmitter pen 10, which causes light beam to emit from the transmitter pen 10. In particular, the light beam signal $S_L$ is a repeated and time-dependent light signal, and the light beam signal $S_L$ is in a 360-degree broadcast pattern. In addition, the light beam signal $S_L$ can be a light with a visible wavelength or a light with an invisible wavelength, such as an infrared light. Further, a curved surface can be employed to distribute the light beam signal $S_L$ in a radial pattern. The light beam signal $S_L$ can be pulsed or continuous and can even be encoded to convey extra information about the transmitter pen 10 or its environment, including pen color, user ID, or audio recordings from the user of the transmitter pen 10.

With reference to FIG. 1, in this embodiment, the number of photo-receiving modules 20 is two, and the two photo-receiving modules 20 are respectively installed at two different corners of the writing surface 41 of the writing board 40. The signal processing unit 30 is electrically connected to the two photo-receiving modules 20. The detailed operations of the transmitter pen 10 and the photo-receiving modules 20 will be described hereinafter as follows.

Figure 3:
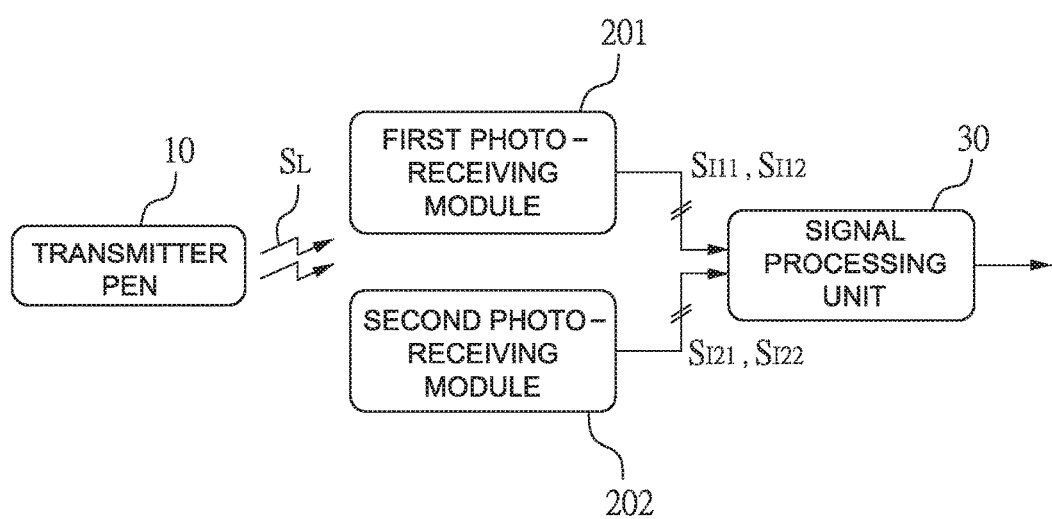
FIG. 3 is a block diagram of the transmitter pen positioning system according to the present disclosure.

For convenience, as shown in FIG. 3, the two photo-receiving modules 20 are a first photo-receiving module 201 and a second photo-receiving module 202. The second photo-receiving module 202 may be identical to the first photo-receiving module 201. The first photo-receiving module 201 and the second photo-receiving module 202 receive the light beam signal $S_L$ outputted from the transmitter pen 10. The light beam signal $S_L$ is received and converted by the first photo-receiving module 201 to form a first photocurrent signal $S_{f11}$ and a second photocurrent signal $S_{f12}$. Similarly, the light beam signal $S_L$ is also received and converted by the second photo-receiving module 202 to form a first photocurrent signal $S_{f21}$ and a second photocurrent signal $S_{f22}$.

Figure 4:
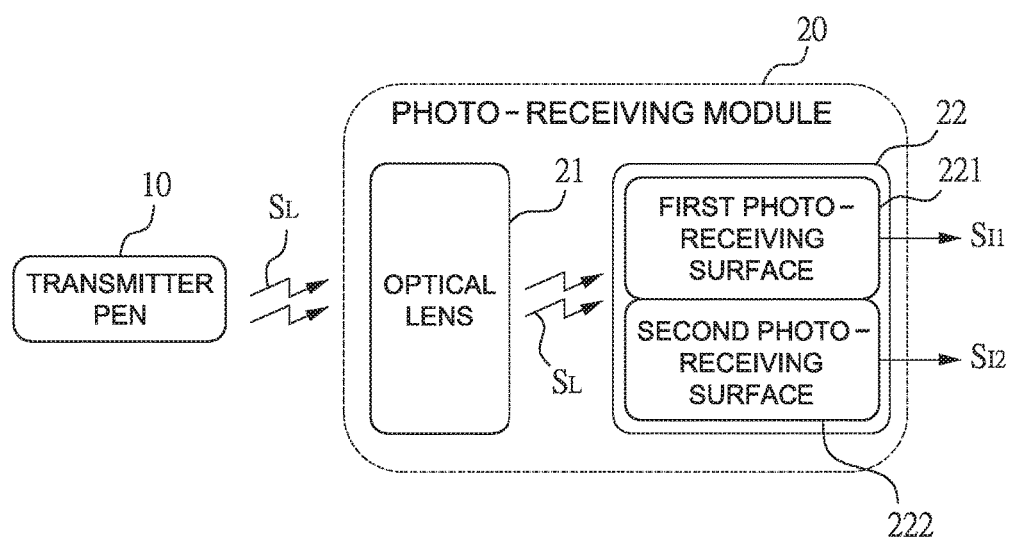
FIG. 4 is a block diagram of a photo-receiving module in FIG. 3 according to the present disclosure.

As shown in FIG. 4, each one of the two photo-receiving modules 20 includes an optical lens 21 and a photo-receiving sensor 22. The optical lens 21 is mounted on an exterior surface of the photo-receiving module 20 and receives the light beam signal $S_L$. The light beam signal $S_L$ further passes through the optical lens 21 to the photo-receiving sensor 22, such that the photo-receiving sensor 22 may detect the light beam signal $S_L$.

The photo-receiving sensor 22 has a first photo-receiving surface 221 and a second photo-receiving surface 222. For example, the photo-receiving sensor 22 can be a split photo-cell sensor, such as a bi-cell photosensor or a quadrant photosensor. Also, the photo-receiving sensor 22 can be an integrated sensor with two or more individual cells. The photo-receiving sensor 22 converts the light beam signal $S_L$ that is received by the first photo-receiving surface 221 into a first photocurrent signal $S_{f1}$. Similarly, the photo-receiving sensor 22 converts the light beam signal $S_L$ that is received by the second photo-receiving surface 222 into a second photocurrent signal $S_{f2}$.

Therefore, each one of the two photo-receiving modules 20, including the first photo-receiving module 201 and the second photo-receiving module 202, may output two signals including the first photocurrent signal $S_{f1}$ and the second photocurrent signal $S_{f2}$. In other words, the first photo-receiving module 201 outputs the first photocurrent signal $S_{f11}$ and the second photocurrent signal $S_{f12}$. Similarly, the second photo-receiving module 202 is used to provide the first photocurrent signal $S_{f21}$ and the second photocurrent signal $S_{f22}$.

With reference to FIG. 3, the signal processing unit 30 is electrically connected to the first photo-receiving module 201 and the second photo-receiving module 202 to receive the four photocurrent signals $S_{f11}$-$S_{f22}$. The detailed operations of the signal processing unit 30 will be described hereinafter as follows.

Figure 5A:
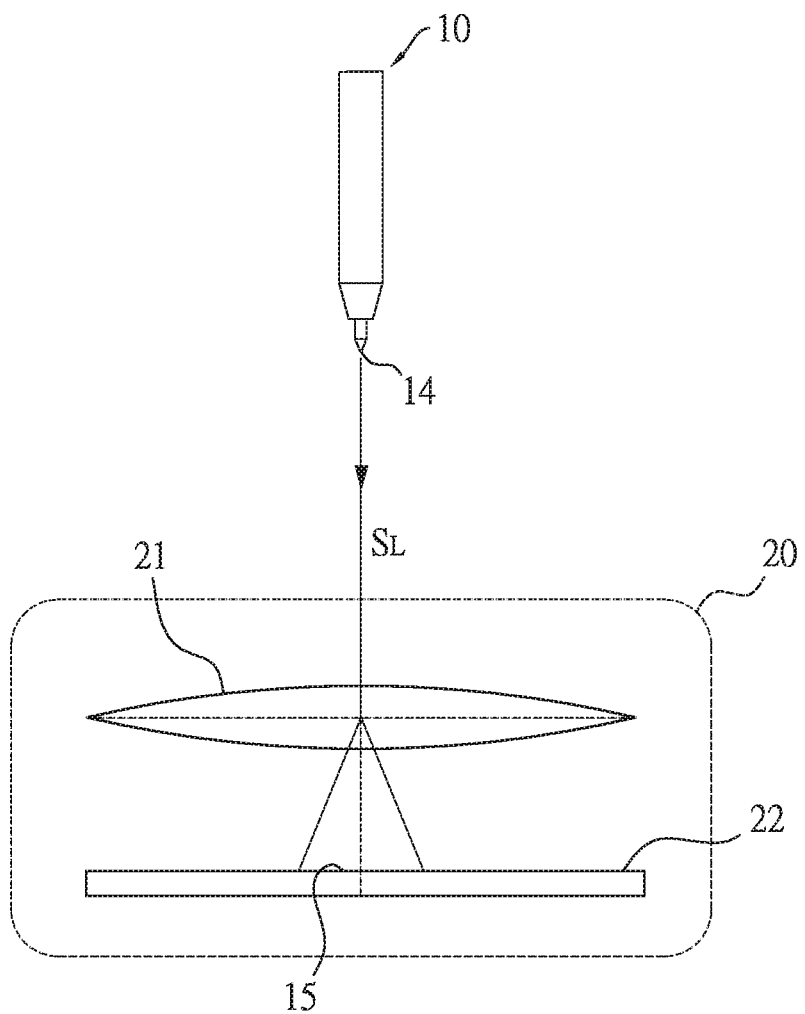
FIG. 5A is a schematic view of showing an incident angle of a light beam signal according to one embodiment of the present disclosure.

As shown in FIG. 5A, the photo-receiving module 20 is installed on a left-bottom position of the writing surface 41 of the writing board 40. Also, the pointing tip 14 of the transmitter pen 10 is forced (written) directly above the photo-receiving module 20 on the writing surface 41. Hence, in this illustrative example, the incident angle of the light beam signal $S_L$ on the optical lens 21 of the photo-receiving module 20 is zero degree.

Figure 5B:
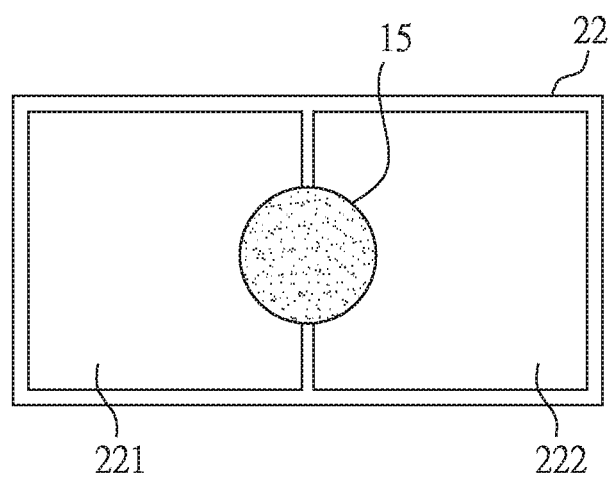
FIG. 5B is a schematic top view of a photo-receiving sensor in FIG. 5A.

As shown in FIG. 5B, with the incident angle equal to zero degree, a beam image 15 of the light beam signal $S_L$ is equally projected on the first photo-receiving surface 221 and the second photo-receiving surface 222 of the photo-receiving sensor 22, i.e., an area of the beam image 15 on the first photo-receiving surface 221 is equal to that on the second photo-receiving surface 222. In this embodiment, the photo-receiving sensor 22 is a bi-cell photosensor. In other words, photons incident on the first photo-receiving surface 221 are equal to those incident on the second photo-receiving surface 222, i.e., the first photocurrent signal $S_{f1}$ is equal to the second photocurrent signal $S_{f2}$.

Figure 6A:
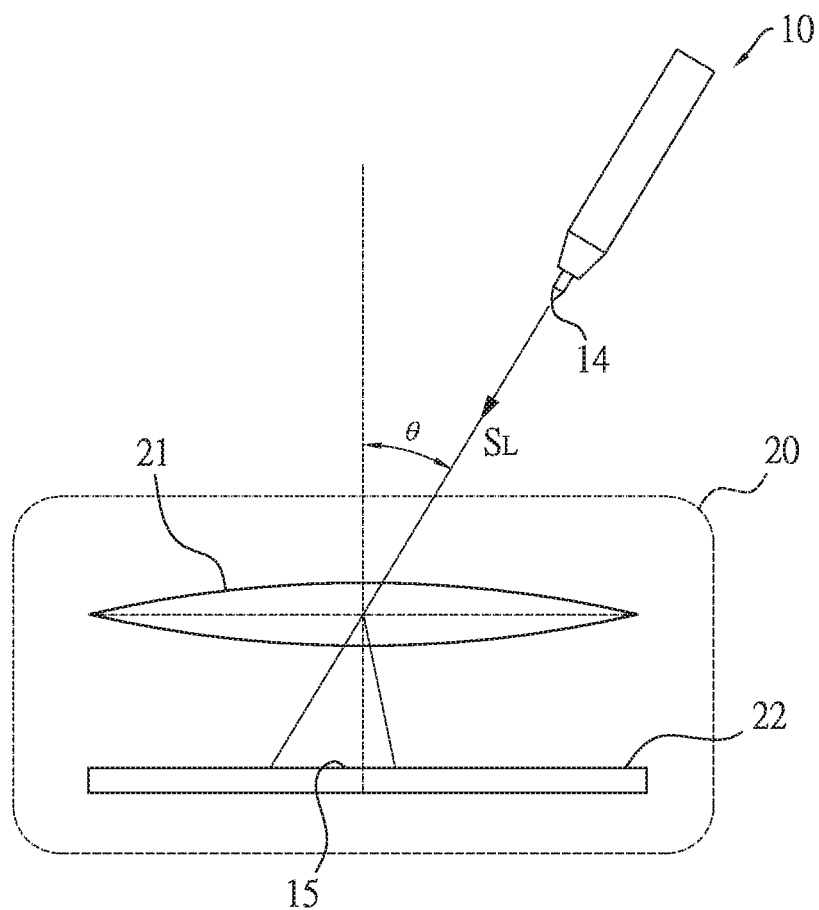
FIG. 6A is a schematic view of showing the incident angle of the light beam signal according to another embodiment of the present disclosure.

As shown in FIG. 6A, the incident angle θ of the light beam signal $S_L$ on the optical lens 21 of the photo-receiving module 20 is approximately 20 degrees in this second illustrative example.

Figure 6B:
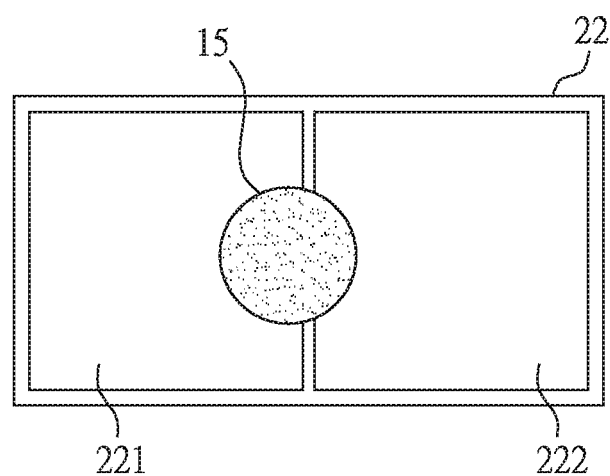
FIG. 6B is a schematic top view of the photo-receiving sensor in FIG. 6A.

As shown in FIG. 6B, the beam image 15 of the light beam signal $S_L$ is unequally projected on the first photo-receiving surface 221 and the second photo-receiving surface 222 of the photo-receiving sensor 22, i.e., the area of the beam image 15 on the first photo-receiving surface 221 is greater than that on the second photo-receiving surface 222 since the beam image 15 is biased towards the first photo-receiving surface 221. In other words, photons incident on the first photo-receiving surface 221 are greater than those incident on the second photo-receiving surface 222, i.e., the first photocurrent signal $S_{f1}$ is greater than the second photocurrent signal $S_{f2}$.

Figure 7:
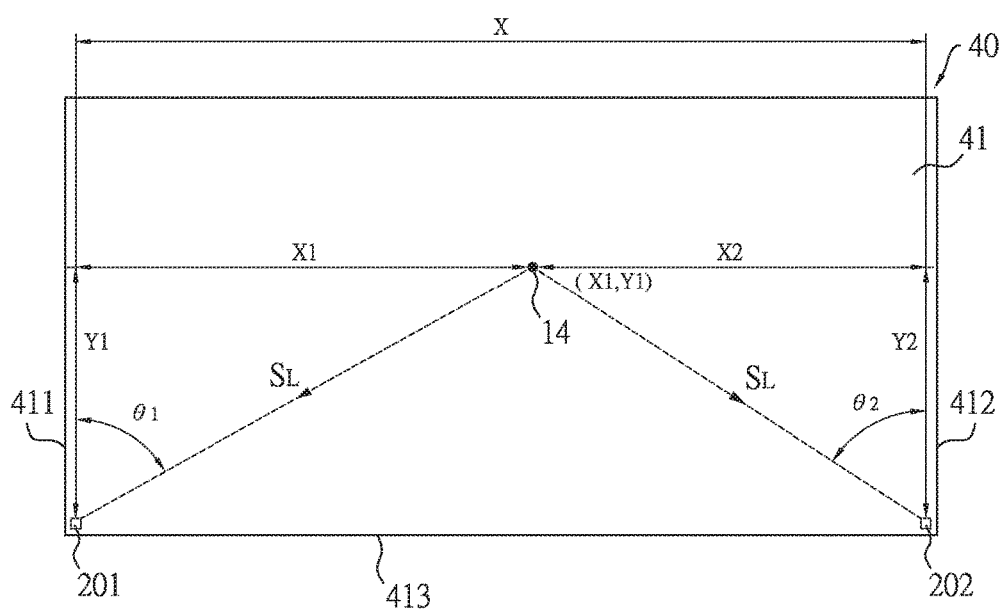
FIG. 7 is a schematic view of calculating position information of the transmitter pen according to a first embodiment of the present disclosure.

Accordingly, the signal processing unit 30 correspondingly calculates the incident angle θ of the light beam signal $S_L$ on the optical lens 21 of each photo-receiving module 20 according to a difference operation between the first photocurrent signal $S_{f1}$ and the second photocurrent signal $S_{f2}$. As shown in FIG. 7, the coordinate of the pointing tip 14 of the transmitter pen 10 is (X1,Y1), wherein the coordinate of the first photo-receiving module 201 is a reference coordinate.

In the present disclosure, we use a normalized difference operation between the two photocurrent signals $S_{f1}, S_{f2}$ to calculate the incident angle. The normalized difference operation between the two photocurrent signals is defined that the incident angle θ is proportional to $(S_{f1}-S_{f2})/(S_{f1}+S_{f2})$ when a constant factor is calibrated out, i.e., $$\theta = \sin^{-1}\left(\frac{S_{f1} - S_{f2}}{S_{f1} + S_{f2}}\right) \quad (1)$$

As expressed in formula (1), the incident angle θ is proportional to an arcsine transformation of a ratio of a difference value between the first photocurrent signal θ and the second photocurrent signal $S_{f2}$ and a sum value of the first photocurrent signal $S_{f1}$ and the second photocurrent signal $S_{f2}$.

In particular, the difference signal $(S_{f1}-S_{f2})$ is divided by the sum signal $(S_{f1}+S_{f2})$ in order to cancel out the effects of light level variation.

As shown in FIG. 7 and FIG. 3, the first photocurrent signal $S_{f11}$ and the second photocurrent signal $S_{f12}$ outputted from the first photo-receiving module 201 are used to calculate a first incident angle θ1 according to the formula (1) by the signal processing unit 30, i.e., $$\theta 1 = \sin^{-1}\left(\frac{S_{f11} - S_{f12}}{S_{f11} + S_{f12}}\right) \quad (2)$$

Similarly, the first photocurrent signal $S_{f21}$ and the second photocurrent signal $S_{f22}$ outputted from the second photo-receiving module 202 are used to calculate a second incident angle θ2 according to the formula (1) by the signal processing unit 30, i.e., $$\theta 2 = \sin^{-1}\left(\frac{S_{f21} - S_{f22}}{S_{f21} + S_{f22}}\right) \quad (3)$$

In particular, the formula of calculating the incident angle θ is validated since a positive $(S_{f1}-S_{f2})$ or a negative $(S_{f1}-S_{f2})$ represents that directions of the incident angle θ of the light beam signal $S_L$ on the optical lens 21 are different.

After calculating the incident angles of the light beam signal $S_L$ on the optical lenses of the photo-receiving modules 20, the signal processing unit 30 calculates the position information of the transmitter pen 10 on the writing surface 41 according to at least two incident angles θ.

With reference to FIG. 7, a known length of the writing surface 41 is X, and the first photo-receiving module 201 is installed at a left bottom corner and close to an intersection of a left margin 411 and a bottom margin 413 of the writing surface 41. The second photo-receiving module 202 is installed at a right bottom corner and close to an intersection of a right margin 412 and the bottom margin 413 of the writing surface 41. Also, X1 is a length between the pointing tip 14 to a virtual extension line in the Y-axis direction at the first photo-receiving module 201, and X2 is a length between the pointing tip 14 to a virtual extension line in the Y-axis direction at the second photo-receiving module 202. Further, Y1 is a length between the pointing tip 14 to a virtual extension line in the X-axis direction at the first photo-receiving module 201 and Y2 is identical to Y1. The first incident angle θ1 is an angle between the virtual extension line in the Y-axis direction at the first photo-receiving module 201 and the light beam signal $S_L$. The second incident angle θ2 is an angle between the virtual extension line in the Y-axis direction at the second photo-receiving module 202 and the light beam signal $S_L$.

The intersection of vectors from the pointing tip 14 to the first photo-receiving module 201 and the second photo-receiving module 202 is calculated by a trigonometric function.

In a first embodiment, the trigonometric function is a tangent transformation that is formulated as follows.

$$X1+X2=X \quad (4)$$

$$Y1=Y2 \quad (5)$$

$$\tan \theta 1 = X1/Y1 \quad (6)$$

$$\tan \theta 2 = X2/Y2 \quad (7)$$

$$X1 = Y1 \times \tan \theta 1 \quad (8)$$

$$X2 = Y2 \times \tan \theta 2 = Y1 \times \tan \theta 2 \quad (9)$$

$$X1+X2 = Y1 \times (\tan \theta 1 + \tan \theta 2) \quad (10)$$

$$Y1 = X \frac{1}{(\tan \theta 1 + \tan \theta 2)} \quad (11)$$

According to the formulas (8) and (11), X1 can be expressed as follows:

$$X1 = X \frac{\tan \theta 1}{(\tan \theta 1 + \tan \theta 2)} \quad (12)$$

Therefore, the coordinate of the pointing tip 14 of the transmitter pen 10 (X1,Y1) can be calculated according the formulas (2), (3), (11), (12).

Figure 8:
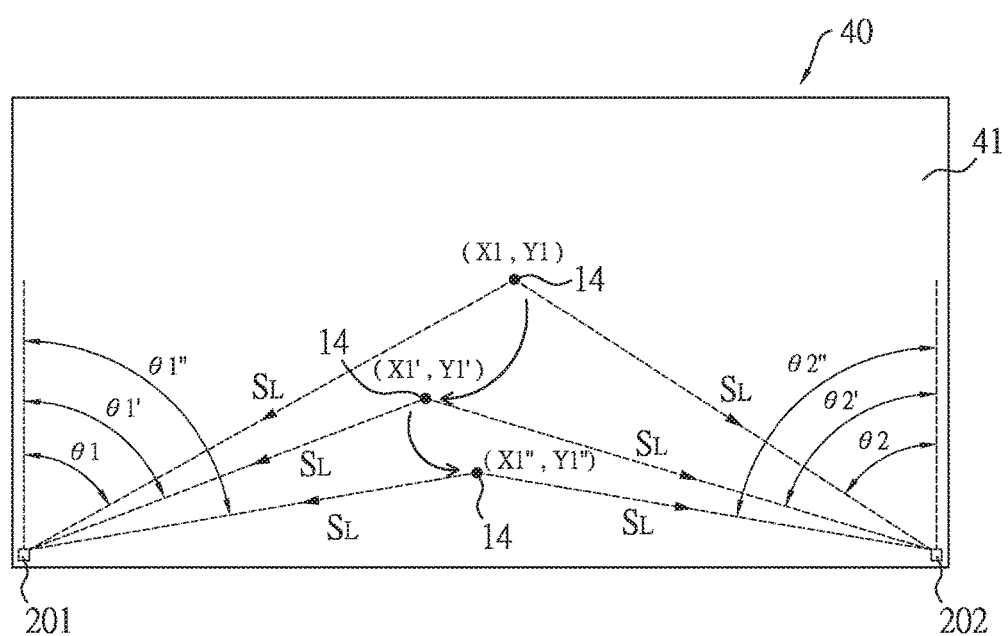
FIG. 8 is a schematic view of calculating position information of the transmitter pen according to a second embodiment of the present disclosure.

As shown in FIG. 8, when the pointing tip 14 of the transmitter pen 10 is written from one coordinate (X1,Y1) to another coordinate (X1',Y1') and further another coordinate (X1",Y1"), the real-time location information of the transmitter pen 10 can be calculated. First, when the pointing tip 14 is in the coordinate (X1,Y1), two incident angles θ1,θ2 can be calculated by the four photocurrent signals $S_{f11}$-$S_{f22}$ according to the formulas (2) and (3), and then the coordinate (X1,Y1) can be calculated by the two incident angles θ1,θ2 according to the formulas (11) and (12). Afterward, when the pointing tip 14 moves to the coordinate (X1',Y1'), two incident angles θ1',θ2' can be calculated by the four photocurrent signals $S_{f11}$-$S_{f22}$ according to the formulas (2) and (3), and then the coordinate (X1',Y1') can be calculated by the two incident angles θ1',θ2' according to formulas (11) and (12). Afterward, when the pointing tip 14 moves to the coordinate (X1",Y1"), two incident angles θ1",θ2" can be calculated by the four photocurrent signals $S_{f11}$-$S_{f22}$ according to the formulas (2) and (3), and then the coordinate (X1",Y1") can be calculated by the two incident angles θ1",θ2" according to the formulas (11) and (12). Accordingly, the real-time location calculation of the transmitter pen 10 is implemented.

Figure 9A:
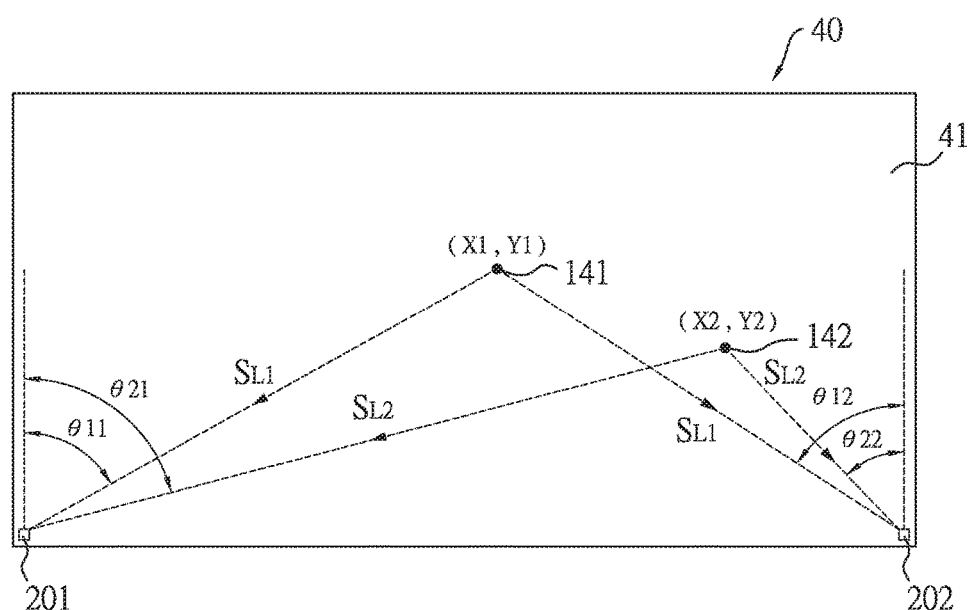
FIG. 9A is a schematic view of calculating position information of the transmitter pens according to a third embodiment of the present disclosure.
Figure 9B:
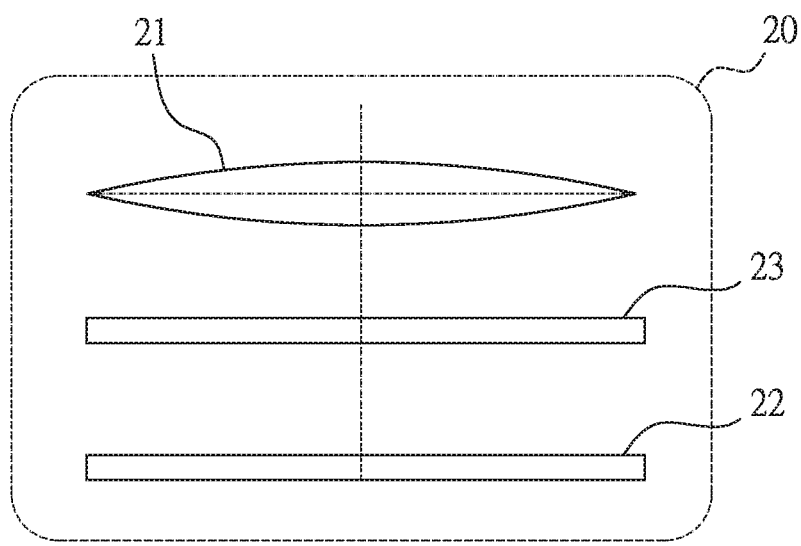
FIG. 9B is a schematic view of the photo-receiving module having a wavelength filtering element according to the present disclosure.

As shown in FIG. 9A, in this embodiment, two transmitter pens 10 are simultaneously used on the writing surface 41. Similarly, when a first pointing tip 141 of a first transmitter pen is in the coordinate (X1,Y1), two incident angles θ11,θ12 can be calculated by four photocurrent signals $S_{f11}$-$S_{f22}$ according to the formulas (2) and (3), and then the coordinate (X1,Y1) can be calculated by the two incident angles θ11,θ12 according to either the formulas (11) and (12) or the formulas (20) and (21). Also, when a second pointing tip 142 of a second transmitter pen is in the coordinate (X2,Y2), two incident angles θ21,θ22 can be calculated by other four photocurrent signals $S_{f11}$-$S_{f22}$ according to the formulas (2) and (3), and then the coordinate (X2,Y2) can be calculated by the two incident angles θ21,θ22 according to either the formulas (11) and (12) or the formulas (20) and (21). In particular, a wavelength of a first light beam signal $S_{L1}$ emitted from the first transmitter pen is designed to be different from a wavelength of a second light beam signal $S_{L2}$ emitted from the second transmitter pen. As shown in FIG. 9B, both the first photo-receiving module 201 and the second photo-receiving module 202 further provide a wavelength filtering element 23 arranged between the optical lens 21 and the photo-receiving sensor 22. Accordingly, the first photo-receiving module 201 and the second photo-receiving module 202 can recognize the first light beam signal $S_{L1}$ and the second light beam signal $S_{L2}$ to correctly acquire the photocurrent signals so that the signal processing unit 30 can calculate incident angles according to the photocurrent signals and then calculate the coordinates of the first pointing tip 141 and second pointing tip 142 according to the corresponding incident angles. Alternatively, the wavelength filtering element 23 can be arranged in front of the optical lens 21. For example, two transmitter pens can be designed to emit at different wavelengths, i.e., one transmitter pen at 810 nm and the other at 950 nm, by choosing different infrared LEDs. The wavelength filtering element 23 of the photo-receiving module 20 can be designed to select one of the transmitter pens' wavelength while filtering out (blocking/ignoring) the other transmitter pen's wavelength.

Figure 10:
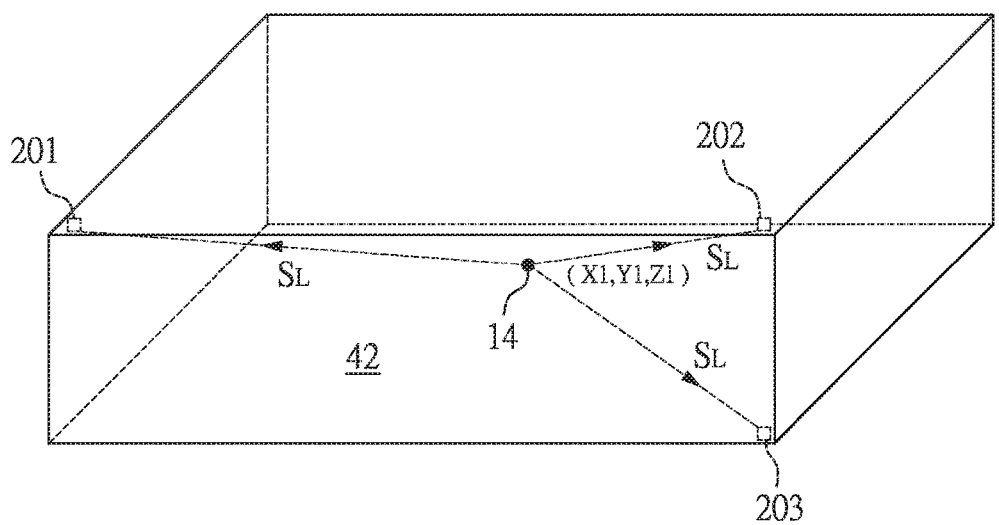
FIG. 10 is a schematic view of calculating position information of the transmitter pen according to a fourth embodiment of the present disclosure.

As show in FIG. 10, the transmitter pen positioning system is further applied to a three-dimensional writing space. The transmitter pen 10 is operated in a writing space 42 and the pointing tip 14 is in a coordinate (X1,Y1,Z1). In order to calculate three coordinate values, i.e., X1,Y1,Z1, at least three photo-receiving modules 201-203 are necessary to be used. In this embodiment, the three photo-receiving modules 201-203 are installed at three different corners of the writing space 42. Also, the writing space 42 is predetermined in the signal processing unit 30, i.e., each side length of the writing space 42 is known. Similarly, the light beam signal $S_L$ is received and converted by the photo-receiving modules 201-203 to correspondingly calculate incident angles of the light beam signal $S_L$ on optical lenses of the photo-receiving modules 201-203. Afterward, the signal processing unit 30 calculates the three coordinate values X1,Y1,Z1 according to the calculated incident angles to find out the position information of the pointing tip 14 in the writing space 42.

In conclusion, the present disclosure has the following advantages:

1. The position information of the transmitter pen 10 is calculated by emitting visible or invisible light beam without using additional motors or ultrasound components so as to simplify system complexity, reduce costs, and lower consumption.

2. The real-time position information of the transmitter pen 10 can be acquired since all incident angles can be simultaneously calculated.

3. The light emitting element 11, such as the LED or the laser diode and the photo-receiving sensor 22, such as the bi-cell photosensor or the quadrant photosensor are intrinsically high-speed so the calculation and measurement of the position information can be made in real-time with fast update frequency, theoretically up to several hundred megahertz to lead smoothly capturing movements of the transmitter pen 10.

4. Additional information, including audio signals and pen information, such as color or line width of the transmitter pen 10 can be easily encoded in the light output from the transmitter pen 10.

5. Calibration and software algorithms for determining position of the transmitter pen 10 are much simpler since there is no need for reference points for time-of-flight measurements.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A transmitter pen positioning system applied to a writing surface, the transmitter pen positioning system comprising:
   a transmitter pen comprising:
      a light emitting element configured to generate a light beam signal;
   at least two photo-receiving modules installed at different positions on the writing surface, and each photo-receiving module comprising:
      an optical lens mounted on an exterior surface of the photo-receiving module and configured to receive the light beam signal to make the light beam signal pass through the optical lens; and
      a photo-receiving sensor having a first photo-receiving surface and a second photo-receiving surface, and the photo-receiving sensor configured to receive the light beam signal via the first photo-receiving surface and the second photo-receiving surface and correspondingly convert the light beam signal into a first photocurrent signal and a second photocurrent signal; and
   a signal processing unit electrically connected to the at least two photo-receiving modules and configured to receive the first photocurrent signal and the second photocurrent signal from each photo-receiving sensor, and the signal processing unit configured to correspondingly calculate an incident angle of the light beam signal on the optical lens of each photo-receiving module according to a difference operation between the first photocurrent signal and the second photocurrent signal and calculate position information of the transmitter pen on the writing surface according to the at least two incident angles.

2. The transmitter pen positioning system as claimed in claim 1, wherein the difference operation is a normalized difference operation, the incident angle of the light beam signal is proportional to a ratio of a difference value between the first photocurrent signal and the second photocurrent signal and a sum value of the first photocurrent signal and the second photocurrent signal.

3. The transmitter pen positioning system as claimed in claim 2, wherein the incident angle of the light beam signal is proportional to an arcsine transformation of the ratio.

4. The transmitter pen positioning system as claimed in claim 1, wherein the position information is calculated by a trigonometric function.

5. The transmitter pen positioning system as claimed in claim 2, wherein the position information is calculated by a trigonometric function.

6. The transmitter pen positioning system as claimed in claim 3, wherein the position information is calculated by a trigonometric function.

7. The transmitter pen positioning system as claimed in claim 4, wherein the trigonometric function is a tangent transformation of the incident angle.

8. The transmitter pen positioning system as claimed in claim 5, wherein the trigonometric function is a tangent transformation of the incident angle.

9. The transmitter pen positioning system as claimed in claim 6, wherein the trigonometric function is a tangent transformation of the incident angle.

10. The transmitter pen positioning system as claimed in claim 1, wherein the number of the at least two photo-receiving modules is two when the transmitter pen positioning system is applied to a two-dimensional writing space.

11. The transmitter pen positioning system as claimed in claim 1, wherein the number of the at least two photo-receiving modules is three when the transmitter pen positioning system is applied to a three-dimensional writing space.

12. The transmitter pen positioning system as claimed in claim 1, wherein the at least two photo-receiving modules are installed at different corners of the writing surface.

13. The transmitter pen positioning system as claimed in claim 1, wherein the photo-receiving sensor is a bi-cell photosensor or a quadrant photosensor.

14. The transmitter pen positioning system as claimed in claim 1, wherein the light beam signal is a light with a visible wavelength or a light with an invisible wavelength.

15. The transmitter pen positioning system as claimed in claim 1, wherein the light emitting element is a light-emitting diode or a laser diode.

\* \* \* \* \*